United States Patent [19]

Conseur et al.

[11] 4,208,928

[45] Jun. 24, 1980

[54] TORSIONAL BALANCER DEVICE HAVING VISCOUS DAMPING AGENT

[75] Inventors: Joachim Conseur; Manfred Hoch, both of Berlin, Fed. Rep. of Germany

[73] Assignee: Carl Hasse & Wrede GmbH, Berlin, Fed. Rep. of Germany

[21] Appl. No.: 889,198

[22] Filed: Mar. 23, 1978

[30] Foreign Application Priority Data

Mar. 30, 1977 [DE] Fed. Rep. of Germany ....... 2714230

[51] Int. Cl.² .............................................. F16F 15/10
[52] U.S. Cl. ...................................................... 74/574
[58] Field of Search ......................................... 74/574

[56] References Cited

U.S. PATENT DOCUMENTS

| 2,594,555 | 4/1952 | Hardy | 74/574 |
| 2,838,955 | 6/1958 | Burch | 74/574 |
| 3,711,968 | 1/1973 | van Heijst | 74/574 X |

FOREIGN PATENT DOCUMENTS

| 102903 | 1/1938 | Australia | 74/574 |
| 219952 | 2/1959 | Australia | 74/574 |
| 730935 | 12/1942 | Fed. Rep. of Germany | 74/574 |
| 951965 | 10/1956 | Fed. Rep. of Germany . | |
| 1074333 | 1/1960 | Fed. Rep. of Germany . | |
| 2362155 | 6/1975 | Fed. Rep. of Germany | 74/574 |
| 666695 | 10/1929 | France | 74/574 |
| 1087739 | 10/1967 | United Kingdom | 74/574 |

*Primary Examiner*—Carroll B. Dority, Jr.
*Assistant Examiner*—Randall L. Green
*Attorney, Agent, or Firm*—Edmund M. Jaskiewicz

[57] ABSTRACT

A torsional balancer device for a rotary shaft such as for a piston engine comprises a primary mass mounted upon the rotary shaft and a secondary mass resiliently supported and mounted with respect to the primary mass so as to be capable of resilient rotational movement with respect thereto. The primary and secondary masses have mutually facing surfaces which define a working space and a viscous damping agent is in the working space. The mutually facing surfaces have profiled configurations so as to form a plurality of chambers the widths of which are varied during relative vibration of the secondary mass with respect to the primary mass. The configurations may comprise coregistering ribs and grooves which have various cross-sectional shapes.

9 Claims, 8 Drawing Figures

TORSIONAL BALANCER DEVICE HAVING VISCOUS DAMPING AGENT

The present invention relates to a torsional balancer device for a rotary shaft such as for a piston engine or the like, more particularly, to the configuration of the mutually facing surfaces of primary and secondary masses of the balancer device to control the movement of a viscous damping agent therebetween.

Torsional balancer devices have been used for damping undesired torsional vibrations and oscillations of rotating shafts in a wide variety of applications and particularly crank shafts for piston engines. Such balancer devices have also been known as harmonic balancers. The balancer device essentially comprises a viscous damping agent enclosed in a working space formed between mutually facing surfaces of a primary mass and the secondary mass. The primary mass is attached to the shaft to be balanced and the secondary mass is mounted with respect to the primary mass so as to be capable of resilient rotational movement with respect thereto.

A known form of such a balancer device is disclosed in the German Pat. No. 951,965 and comprises a viscous damping agent wherein an annular seismic mass in the form of a rotatable ring, the so-called secondary mass, is enclosed and supported in a housing, the so-called primary mass, which is attached to and rotates with the shaft to be balanced. In response to alternating torsional moments, the rotating ring performs small rotary oscillations with respect to the housing at frequencies ranging about 50–200 cycles per second. Other interferring vibrations or oscillations may be imposed on the rotary oscillations so as to cause the ring to also slowly rotate.

Another form of such a balancer device is disclosed in German Pat. No. 1,074,333 wherein an external seismic mass is attached by means of alternately twisted annular rubber springs to the primary mass which in turn is mounted upon the shaft. The rubber springs function not only as resilient support elements but also as packing for the damping agent.

Such known balancer devices have the disadvantage in that the viscous damping agent converts the vibrational energy into heat energy because the damping agent is subjected to alternating shearing stresses between the closely spaced smooth mutually facing surfaces of the primary and secondary members of the vibration damping device. The effectiveness or capacity for damping vibrations and the useful operating life of such a balancer device depend on the adhesion of the damping agent to the surfaces and the capacity of the molecular structure of the damping agent to resist the alternating shearing stresses.

It is therefore the principal object of the present invention to provide a novel and improved torsional balancer device of the type described herein.

It is another object of the present invention to improve the performance of vibration damping capacity of such a torsional balancer device.

It is a further object of the present invention to provide such a torsional balancer device wherein the vibration energy in the viscous damping medium is no longer converted exclusively through shearing into heat energy and the resiliency of the viscous resilient coupling between the primary and secondary masses is increased.

According to one aspect of the present invention a torsional balancer device may comprise a primary mass mounted upon a rotary shaft to be damped and a secondary mass resiliently supported and mounted with respect to the primary mass so as to be capable of resilient rotational movement with respect thereto. The primary and secondary masses have mutually facing surfaces to define a working space therebetween and a viscous damping agent is in the working space. The mutually facing surfaces are provided with profiled configurations which define a plurality of chambers the widths of which are varied during relative vibration of the secondary mass with respect to the primary mass.

As a result of this structure, the viscous damping agent during a full vibration is forced from a narrowing chamber into a widening chamber of the working space and then back in connection with expenditure of squeezing work. The shearing stress is thus held to a minimum. This structure also increases the elasticity or resiliency of the viscous-resilient coupling between the primary and secondary masses of the balancer device.

By an appropriate configuration or shaping of the mutually facing surfaces defining the working space which surfaces may be both, radial and peripheral, the spaces are divided into a plurality of chambers whose widths are varied during the relative vibration of the secondary mass with respect to the primary mass synchronously with the vibration. The varying in widths of the chambers forces the viscous damping agent to perform a reciprocating movement over a relatively short distance. The number and cross-sectional width and shape of the chambers as well as their directions in the meridial planes will also exert a favorable effect on the elasticity of the viscous-resilient coupling between the masses. This effect is also enhanced by particular characteristics of the substance of the viscous damping agent itself.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
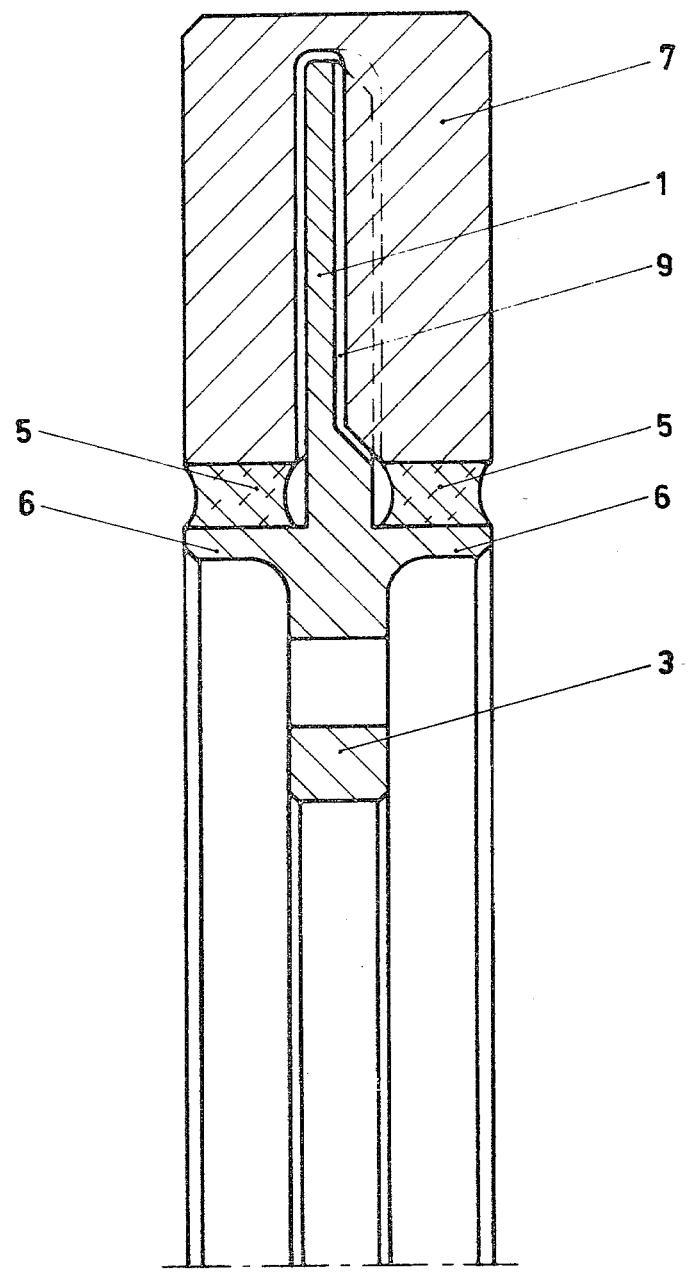
FIG. 1 is an axial sectional view of one half of a torsional balancer device according to the present invention wherein the seismic mass is constructed as the housing.

In the torsional damper of FIG. 1, the primary mass comprises an annular member 1 having undulations thereon and connected to a mounting flange 3 having a plurality of openings therein for attachment by bolts or screws to the shaft of a piston engine or the like which is to be damped. The undulated member 1 is provided with lateral extensions 6 which extend axially with respect to the balancer device and annular rubber springs 5 rest upon or are attached to these lateral extensions. A secondary mass 7 is disposed radially with respect to the extension 6 and is supported and guided for resilient rotational movement with respect to the primary mass by the rubber springs 5. The rubber springs 5 are capable of guiding the secondary mass both in the radial and axial directions.

The secondary mass 7 and undulated member 1 have mutually facing surfaces which are spaced from each other as shown in FIG. 1 so as to form a working space 9 therebetween. This space is filled with a viscous damping agent as known in the art. The mutually facing surface of the secondary mass 7 is also shaped to be undulating and to coregister with the undulating surfaces of the annular member 1. As result, there are formed a plurality of mutually engaging ribs and grooves formed alternately on the undulated member 1 and secondary mass 7.

In the event of any relative rotary movement between the undulated member 1 and the secondary mass 7, the widths of the chambers in the working space will vary so as to become narrower and wider. The viscous damping agent during the course of one complete vibration will thus be forced from a narrowing chamber into a widening chamber and then back in connection with the expenditure of squeezing work. As result, the shearing stress of the damping agent is maintained at a minimum.

Figure 2:
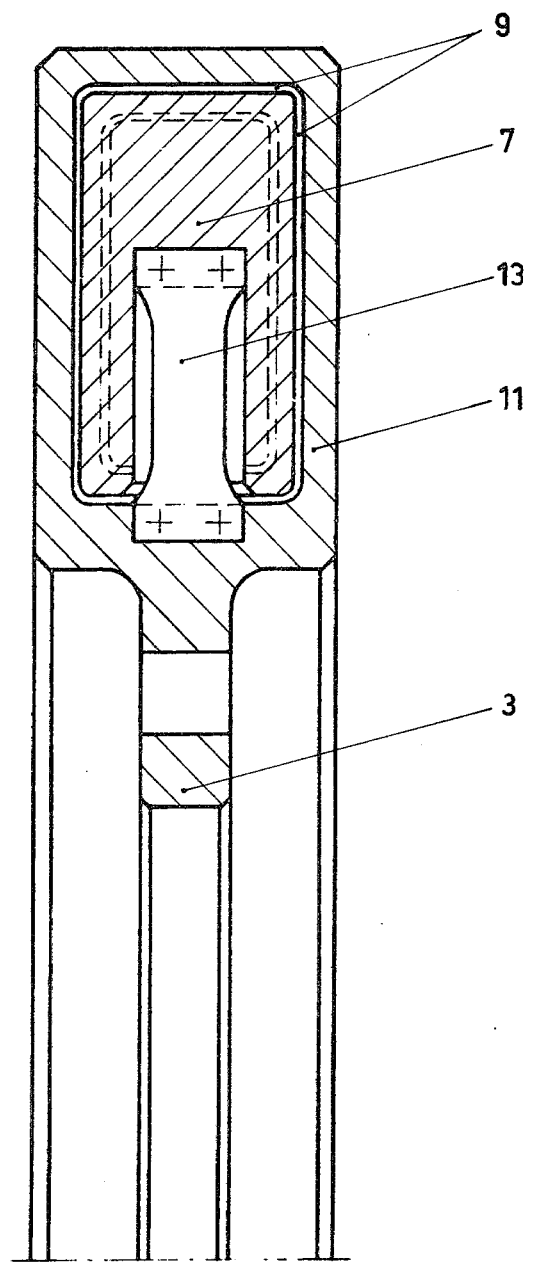
FIG. 2 is a view similar to that of FIG. 1 but wherein the seismic mass comprises a rotating ring.

In the balancer device of FIG. 2, the primary mass comprises a hermetically closed housing 11 which is similarly provided with a flange 3 for attachment to the shaft to be damped. A secondary or seismic mass 7 in the form of an annular element is rotatably supported on the inner peripheral surface of the housing 11 by three or more leaf springs 13. The secondary mass 7 can also be supported from the primary mass by means of annular rubber springs in a manner similar to that disclosed in FIG. 1.

A working space 9 is formed between the radial mutually facing surfaces of the housing 11 and annular member 7 and the inner and outer peripheral surfaces of the housing 11 and seismic mass 7. In accordance with the present invention, the working space 9 is segmented or divided through alternate mutually engaging ribs and grooves on the mutually facing surfaces of the secondary mass 7 and the housing 11. These ribs may be provided both on the radial and the inner and outer peripheral surfaces.

Figure 3:
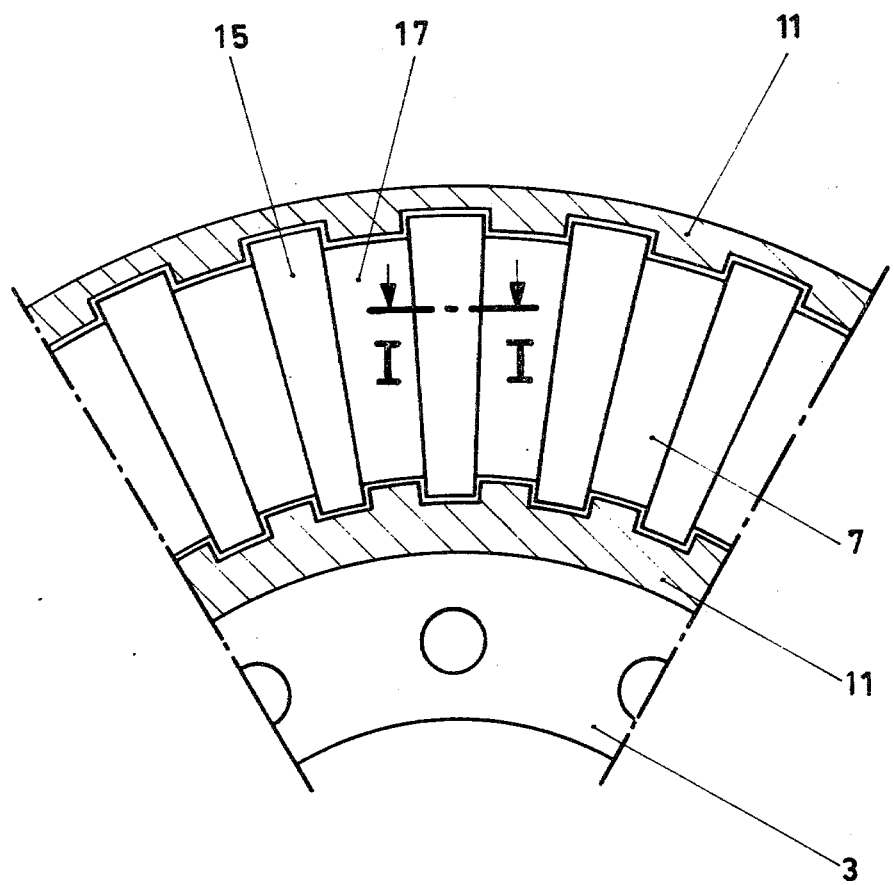
FIG. 3 is a radial sectional view of a portion of a balancer device according to the present invention having radially extending ribs and grooves in the working space.

As may be seen in FIG. 3, the secondary mass 7 within the housing 11 is provided on at least one of its radial surfaces with straight radially extending ribs 15 and grooves 17. These ribs and grooves extend over onto the outer and inner peripheral surfaces of the annular member 7 as may also be seen in FIG. 3. The mutually facing surfaces of the housing 11 are provided in a corresponding manner with ribs and grooves such that the ribs and grooves on the mutually facing surfaces of the seismic 7 in housing 11 coregister with each other and are spaced from each other to define a gap therebetween.

Under particular circumstances, the ribs and grooves may be provided only on the outer or only on the inner peripheral surfaces of the secondary mass 7 and housing 11 or only on their radial surfaces. The ribs and grooves on the peripheral surfaces are parallel and extend axially with respect to the torsional balancer. Various combinations of these surface configurations may be employed again depending upon the particular conditions or circumstances.

It is to be noted that while the ribs 15 and grooves 17 have been defined as straight their surfaces as viewed in FIG. 3 are not parallel but extend radially in substantial the shape of a fan. However, these fan or wedge shaped ribs and grooves may be modified considerably with respect to the existing radius of the torsional balancer.

Figure 4:
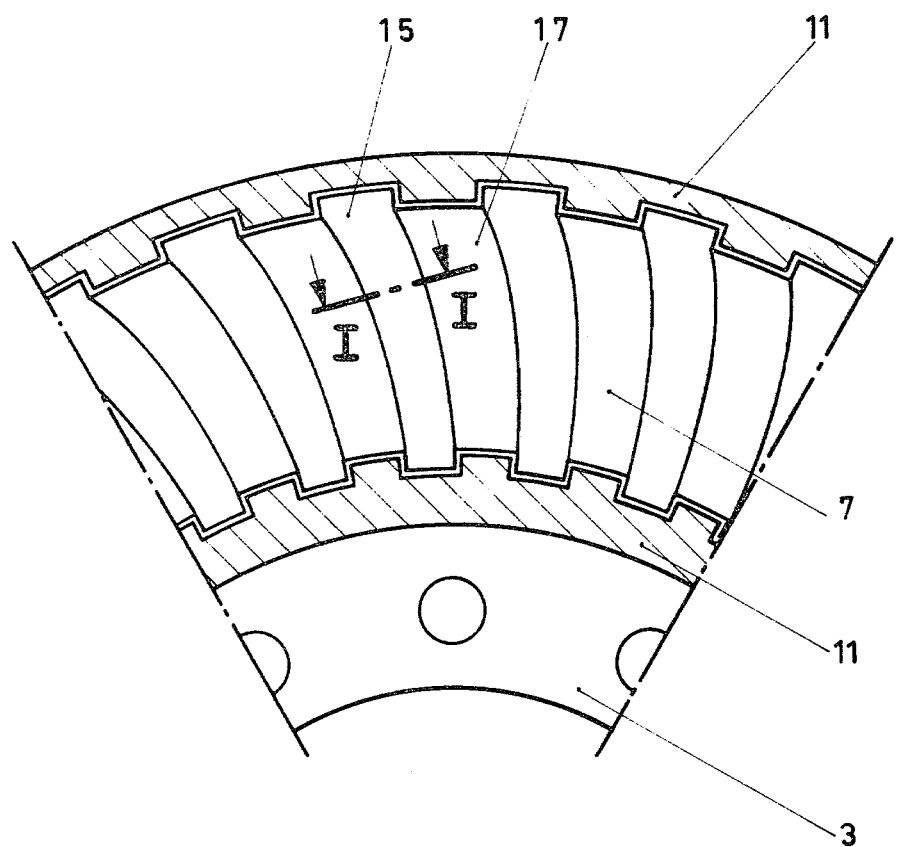
FIG. 4 is a view similar to that of FIG. 3 but of a balancer device having spirally extending ribs and grooves.

In FIG. 4, the torsional balancer is provided with ribs and grooves 15 and 17 on the lateral surfaces of the secondary mass 7 but the ribs and grooves are in the shape of Archimedean spirals. The ribs or grooves may be curved according to curves of a higher order or may be relatively straight and inclined in relation to their respective radii.

The ribs and grooves of FIG. 4 are arranged and shaped in a corresponding configuration on the mutually facing surfaces of the housing. The shapes of the ribs and grooves of FIG. 4 can also be applied to the torsional balancer of FIG. 1.

The various cross-sectional shapes or profiled configurations of the ribs and grooves are disclosed in FIGS. 5–8 as described above. These views show portions of the housing 11 and secondary mass 7 with their mutually facing surfaces defining a working space 9 therebetween and this working space is filled with a viscous damping agent. The working space 9 is provided in the same manner as between undulated member 1 and secondary mass 7 in the balancer device of FIG. 1.

Figure 5:
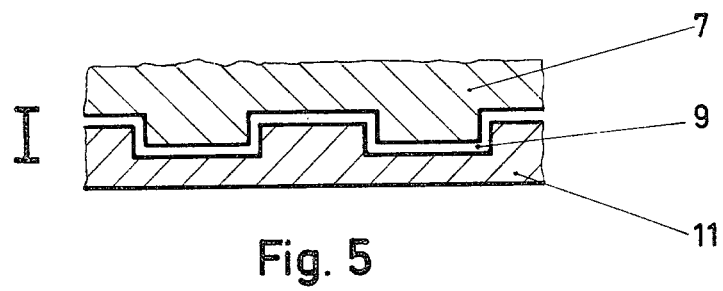
FIGS. 5–8 are sectional views taken along the line I—I of FIG. 3 or FIG. 4 and showing ribs and grooves of different shapes.
Figure 6:
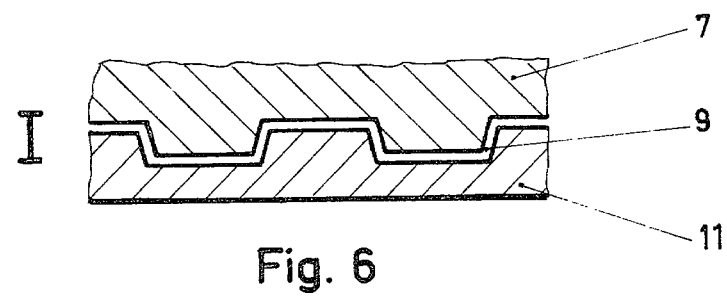
Figure 7:
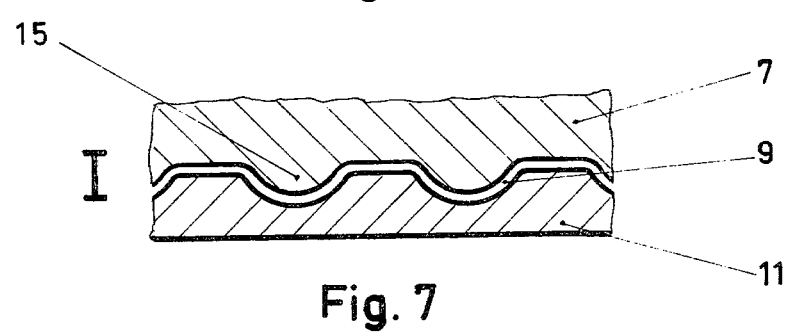
Figure 8:
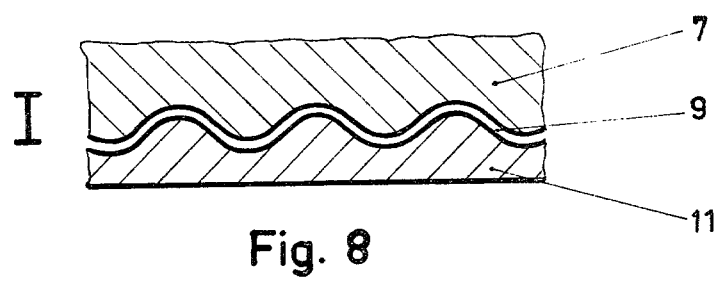

In cross-section, the ribs and grooves of FIG. 5 are shaped as rectangles which may have slightly rounded corners. In FIG. 6, the shapes are in the form of trapezoids also having rounded corners. The shorter oblique sides of the trapezoidal shaped ribs and grooves may be curved in a manner simulating an involute indentation. In FIG. 7, the ribs 15 have a semi-circular cross-section and alternate with plane-parallel sections on the secondary mass 7. In FIG. 8, the ribs have a sinusoidal shape.

It is to be borne in mind that the present invention is not limited to the disclosed geometrical shapes of the ribs and grooves. This applies also for the surface configuration of the secondary mass and the housing. Accordingly, in addition to the disclosed rib and groove profiles, it is possible to utilize smaller configurations on the mutually facing radial and peripheral surfaces of the primary and secondary masses.

Thus it can be seen that the present invention has provided a torsional balancer device which avoids subjecting the viscous damping agent to alternating shearing stresses. Avoiding the shearing stresses greatly reduces the temperature to which the damping agent is subjected and, as a result, the operating life of the balancer device as a unit is significantly prolonged. Relative vibration between the secondary and primary masses thus subjects the damping agent to relatively short reciprocating movements and avoids subjecting the damping agent as a mass to a substantial shearing stress.

It will be understood that this invention is susceptible to modification in order to adapt it to different usages and conditions, and accordingly, it is desired to comprehend such modifications within this invention as may fall within the scope of the appended claims.

What is claimed is:

1. A torsional balancer device comprising a primary mass having means thereon for mounting upon a rotary shaft to be damped, an annular secondary mass, a plurality of radially extending leaf springs resiliently supporting and mounting said secondary mass around a peripheral portion of said primary mass so that said secondary mass is capable of resilient rotational movement with respect thereto, said primary and secondary masses having radial mutually facing surfaces and peripheral mutually facing surfaces to define working spaces therebetween, a viscous damping agent in said working spaces, a plurality of alternate mutually engaging ribs and grooves on said radial mutually facing surfaces, said engaging ribs and grooves defining a plurality of alternating chambers the widths of which are varied during relative movement of said secondary mass to said primary mass such that the damping agent is forced from a narrowing chamber into a widening chamber whereby shearing stress of the damping agent is maintained at a minimum, said peripheral mutually facing surfaces also comprising ribs and grooves for defining a plurality of alternating chambers.

2. A torsional balancer device as claimed in claim 1 wherein the radial surface on said primary mass has radially extending ribs and the radial surface on said secondary mass has radial grooves coregistering with and spaced from said ribs to define a gap therebetween.

3. A torsional balancer device as claimed in claim 2 wherein said radial ribs and grooves are straight and inclined to their respective radial directions.

4. A torsional balancer device as claimed in claim 2 wherein said radial ribs and grooves are curved in the form of one of Archimedian spirals and of higher order curves.

5. A torsional balancer device as claimed in claim 2 wherein said radial ribs and grooves have a rectangular cross-sectional shape.

6. A torsional balancer device as claimed in claim 2 wherein said radial ribs and grooves have a trapezoidal cross-sectional shape with rounded corners.

7. A torsional balancer device as claimed in claim 2 wherein said radial ribs and grooves have a semi-circular cross-sectional shape.

8. A torsional balancer device as claimed in claim 2 wherein said radial ribs and grooves have a cross-sectional shape in the form of a sinusoidal curve.

9. A torsional balancer device as claimed in claim 1 wherein one of said mutually facing peripheral surfaces has axial ribs thereon and the other has axial grooves thereon coregistering with and spaced from said ribs.

* * * * *